A. A. WEIGEL.
LATERAL MOTION DEVICE.
APPLICATION FILED SEPT. 7, 1915.
1,187,687.
Patented June 20, 1916.
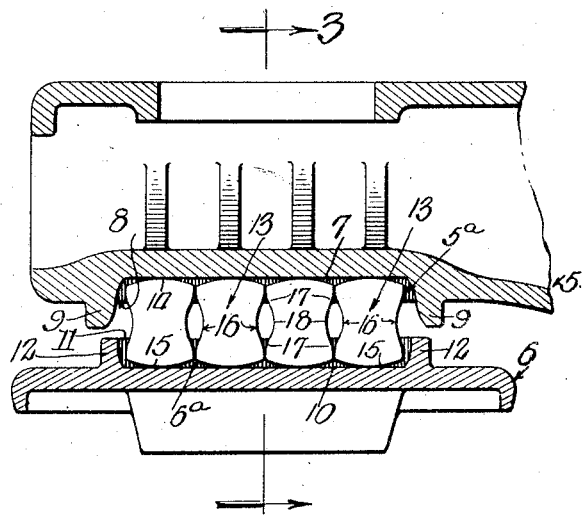
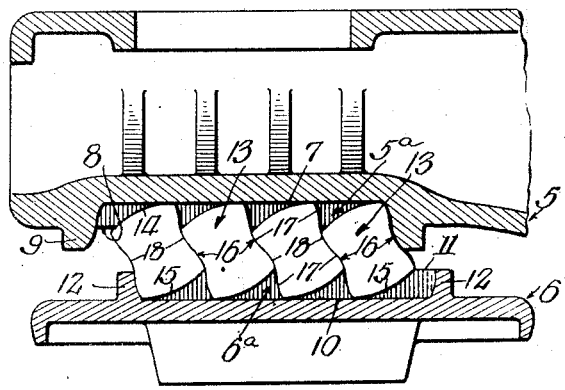
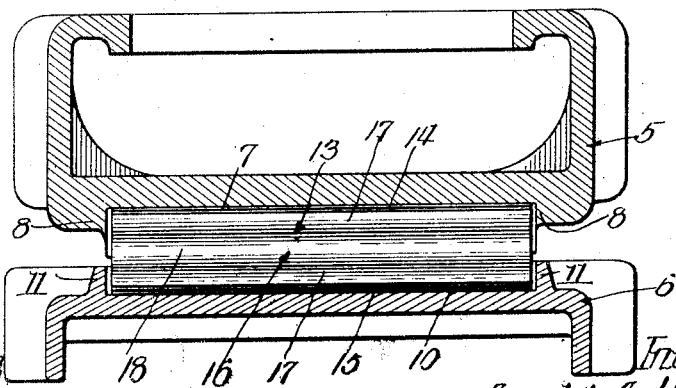

UNITED STATES PATENT OFFICE.

ARNOLD A. WEIGEL, OF CHICAGO, ILLINOIS, ASSIGNOR TO ALBERT G. WELCH, OF CHICAGO, ILLINOIS, TRUSTEE UNDER THE WILL OF EDWIN S. WOODS, DECEASED.

LATERAL-MOTION DEVICE.

1,187,687.  Specification of Letters Patent.  Patented June 20, 1916.

Application filed September 7, 1915. Serial No. 49,151.

*To all whom it may concern:*

Be it known that I, ARNOLD A. WEIGEL, a citizen of the United States, and a resident of Chicago, in the county of Cook and State of Illinois, have invented certain new and useful Improvements in Lateral-Motion Devices; and I do hereby declare that the following is a full, clear, and exact description thereof, reference being had to the accompanying drawings, and to the letters of reference marked thereon, which form a part of this specification.

This invention relates to improvements in lateral motion devices and consists of the matters hereinafter described and more particularly pointed out in the appended claims.

The invention is herein illustrated and described as being used in connection with railway car trucks but as will be apparent, it is also applicable for use in other connections where its peculiar characteristics may be of advantage.

In the drawings: Figure 1 illustrates a central longitudinal sectional view through one end of a car truck bolster and associated truck frame plate in connection with which my improved lateral motion device is used. Fig. 2 illustrates a view similar to Fig. 1 with the parts in changed relation. Fig. 3 illustrates a transverse sectional view thereof taken in a plane indicated by the line 3—3 of Fig. 1.

Referring now to that embodiment of my invention illustrated in the accompanying drawings:—5 indicates the truck bolster of a railway car and 6 indicates a bearing plate which is carried by the usual truck frame (not shown). On the bottom side of said truck bolster adjacent its end is formed a substantially rectangular shallow recess $5^a$, having a horizontal top wall providing a downwardly facing flat bearing surface 7. Side and end flanges 8 and 9 form respectively the side and end walls of the recess. On the top of the bearing plate 6 is provided a similar recess $6^a$, with a horizontal, upwardly facing, bearing surface, 10 and side and end walls defined by side and end flanges 11 and 12 respectively.

Between the truck bolster bearing surface 7 and the like bearing surface 10, on the truck frame plate 6, a plurality of closely spaced antifriction rocker elements are interposed, each of which is indicated by the numeral 13. As herein illustrated, there are four of such elements, but it will be understood that any desired number of such rockers may be used in a bearing, depending, of course, upon the load to be transmitted between the truck bolster and associated truck frame plate.

The rockers 13 are preferably of a length approaching the width of the truck bolster and truck frame plate and have top and bottom surfaces 14 and 15 respectively, which have direct bearing engagement with the bearing surfaces 7 and 10 before referred to. Each of said rocker bearing surfaces 14 and 15 are cylindrical and have a radius which is preferably about equal to the vertical height of the rocker. Each rocker has reversely curved sides 16 which are curved inwardly toward the vertical axial plane thereof, from lines in which the top and bottom bearing surfaces of said rocker terminate as is shown at 17, in such manner that as the elements rock, the like lines of adjacent elements will ride upon, without binding against, said sides as is illustrated in Fig. 2.

By providing an intermediate reverse curve in the sides of each rocker of the same radius as is indicated at 18, when the said rockers have been rocked through the full amplitude of their oscillation, the sides of one element or rocker will engage and lock against the sides of adjacent elements or rockers and prevent further movement of said elements so that they will then form in effect a rigid bearing block having a plurality of spaced bearing surfaces.

The inner face $9^a$ of each flange 9 at the ends of the bearing surface 7 in the truck bolster is of such contour as will afford a bearing engagement with an associated part of the reversely curved side of the proximate end element 13 when the elements have oscillated through the full amplitude of their movement in either direction. The inner face $12^a$ of each end flange of the truck frame plate bearing surface is formed to provide a like engagement of the proximate end element under like conditions. The side flanges 8 and 11 of the truck bolster and truck frame plate 5 and 6 respectively act to retain said elements against endwise displacement and to receive and resist such end thrust as may be imposed upon them by said elements.

When a lateral surging or swaying movement occurs between the truck bolster and truck frame plate, such movement will produce a rocking movement of the rocker elements 13 and with the top and bottom bearing surfaces formed as before described, such movement will be resisted, on account of the raising movement imparted to the truck bolster. This resistance will manifestly increase toward the end movement and thus retard or "ease up" said movement as the elements approach an interlocking position. This "easing up" of the movement prevents breakage of the parts and eliminates noise, which is objectionable, especially on passenger cars.

When a full amplitude of movement of the rocker elements has occurred, all of said elements will be resting upon and locked against adjacent elements, and the outer sides of the endmost elements will be engaged with opposite end flanges 9 and 12, of the truck bolster and truck frame plate respectively. Under the weight of the load, the truck bolster will automatically return to its normal position by reason of gravity. Since the rocker elements are of least height along that diameter which is vertical when said elements are in their normal position gravity will cause the truck bolster to swing the rockers back toward said normal position. As the top and bottom bearing surfaces of the elements always have a bearing engagement with the bearing surfaces of the truck bolster and truck frame plate, the rocker elements will be centered in their return movement relative to the bearing surfaces 7 and 10 before mentioned.

As will be apparent from the foregoing description, my improved lateral motion device possesses advantages in that with such rocker elements as have been described, I am enabled to provide more elements in a smaller limited space than has heretofore been possible, so that the load being transmitted between the truck bolster and truck frame plate is distributed over a greater number of elements, thereby being capable of resisting such load, doing away with breakage or crushage of such elements, which occurs when only one or two of them are used.

The cross section of the rockers is such as will permit their being made of rolled metal instead of cast metal, thus adding strength and cheapness in manufacture, to its various other advantages.

While in describing my invention I have referred to certain details in construction and arrangement of parts, I do not wish to be limited thereto except as may be pointed out in the appended claims.

I claim as my invention:

1. A lateral motion device comprising in combination with members providing top and bottom bearing surfaces, a plurality of closely spaced antifriction rocker elements located therebetween and having top and bottom cylindrical bearing surfaces normally engaged therewith, the top and bottom bearing surfaces of said rocker elements having radii which are greater than one-half the vertical height of said rockers, and having their adjacent sides constructed to provide interacting bearing surfaces between said elements, said interacting bearing surfaces being so formed that the side of one element bears against the sides of adjacent elements throughout substantially the full rocking movement of said rockers and acting to stop further movement thereof and interlock them together when they have been rocked through the predetermined angle, and means on said members with which the end elements engage when said elements are in their interlocked position.

2. A lateral motion device comprising in combination with members providing top and bottom bearing surfaces, a plurality of closely spaced antifriction rocker elements located therebetween and having top and bottom cylindric bearing surfaces normally engaged therewith, the top and bottom bearing surfaces of said rocker elements having equal radii which are greater than one-half the vertical height of said rockers, and having their adjacent sides constructed to provide interacting bearing surfaces between said elements, said bearing surfaces being so formed that the side of one element bears against the sides of adjacent elements throughout substantially the full rocking movement of said rockers and acting to stop further movement thereof and interlock them together when they have been rocked through the predetermined angle, and flanges formed on said members at the ends of said bearing surfaces with which the end elements engage when said elements have been rocked throughout their predetermined movement.

3. In a lateral motion device comprising in combination with members providing top and bottom bearing surfaces, side flanges formed on said members defining said bearing surfaces, a plurality of closely spaced antifriction rocking elements located between said bearing surfaces and having top and bottom cylindric bearing surfaces engaged therewith and adapted to rock through a predetermined angle, the said top and bottom bearing surfaces of said rocker elements having equal radii which are greater than one-half the vertical height of said rockers, and having their adjacent sides constructed to provide interacting bearing surfaces between said elements, said bearing surfaces being so formed that the side of one element bears against the sides of adjacent elements throughout substantially the full rocking movement of said rockers and acting to stop further movement thereof and interlock them together when they have been rocked through the predetermined angle, the side of the end rockers engaging with opposite top and bottom end flanges after said elements have been rocked through the full amplitude of their movement, the side flanges acting to retain said antifriction elements against endwise displacement.

4. In a lateral motion device comprising in combination with members having oppositely facing recesses, the horizontal walls of which provide top and bottom bearing surfaces which are defined by end and side flanges, a plurality of closely spaced rocker elements interposed between said bearing surfaces, having top and bottom cylindric bearing surfaces engaged therewith, said elements being adapted to rock through a predetermined angle, the sides of said elements being so constructed as to provide interacting bearing surfaces between said elements, said interacting bearing surfaces being so formed that the sides of one element bears against opposite sides of adjacent elements throughout substantially the full rocking movement thereof, the outer side of the end rockers engaging with opposite end flanges of said recesses after said elements have rocked through their predetermined angle, the side flanges of said recesses acting to retain said elements in proper relation to said recesses against endwise displacement.

In testimony, that I claim the foregoing as my invention I affix my signature in the presence of two witnesses, this 31st day of August A. D. 1915.

ARNOLD A. WEIGEL.

Witnesses:
T. H. ALFREDS,
KARL W. DOLL.